Nov. 24, 1953   L. M. BERTRAND   2,660,134
PROCESS FOR MANUFACTURING BREAD STICKS
Filed July 14, 1948   2 Sheets-Sheet 1
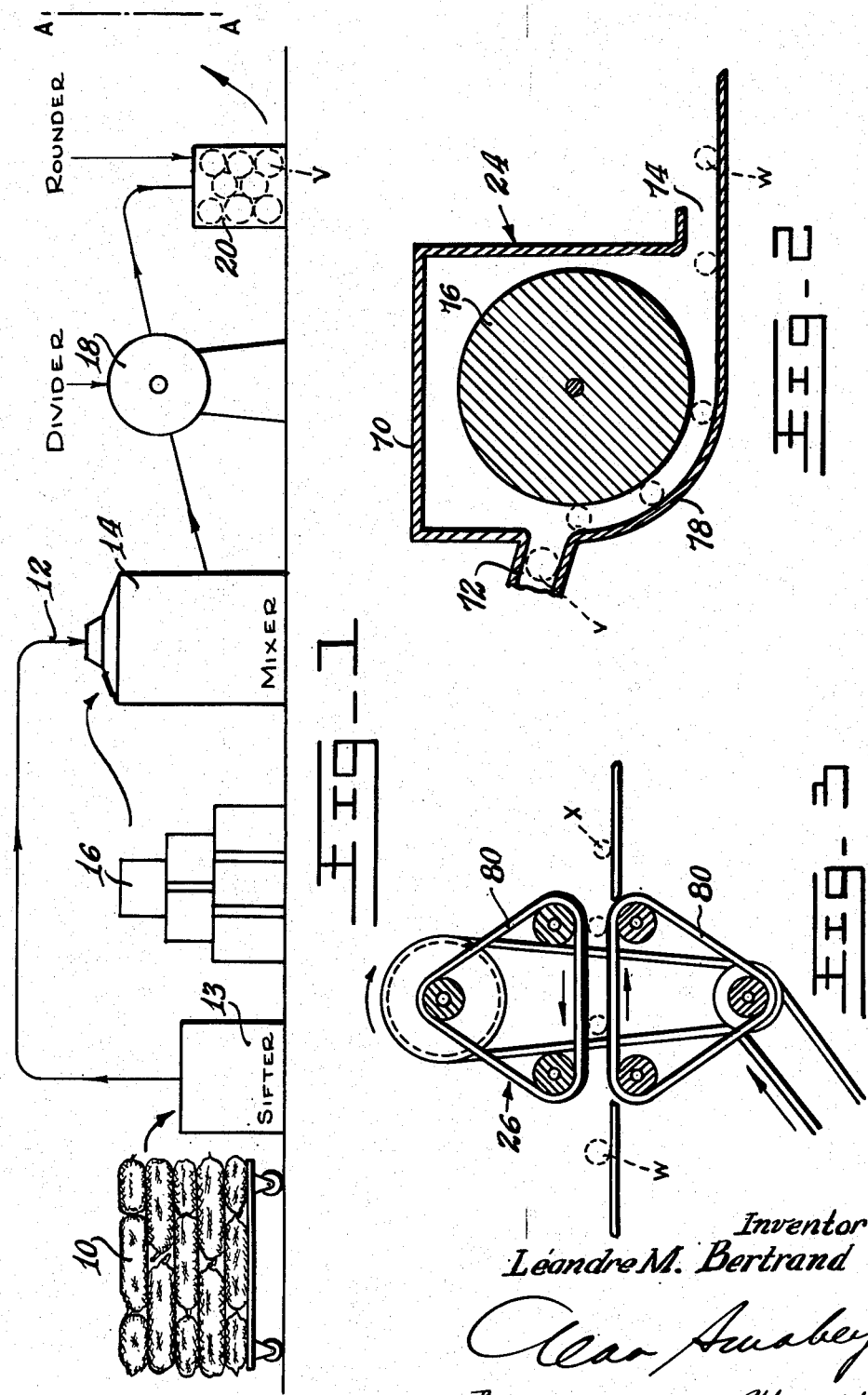
Inventor
Léandre M. Bertrand
By  *Alan Ausubel*
Attorney

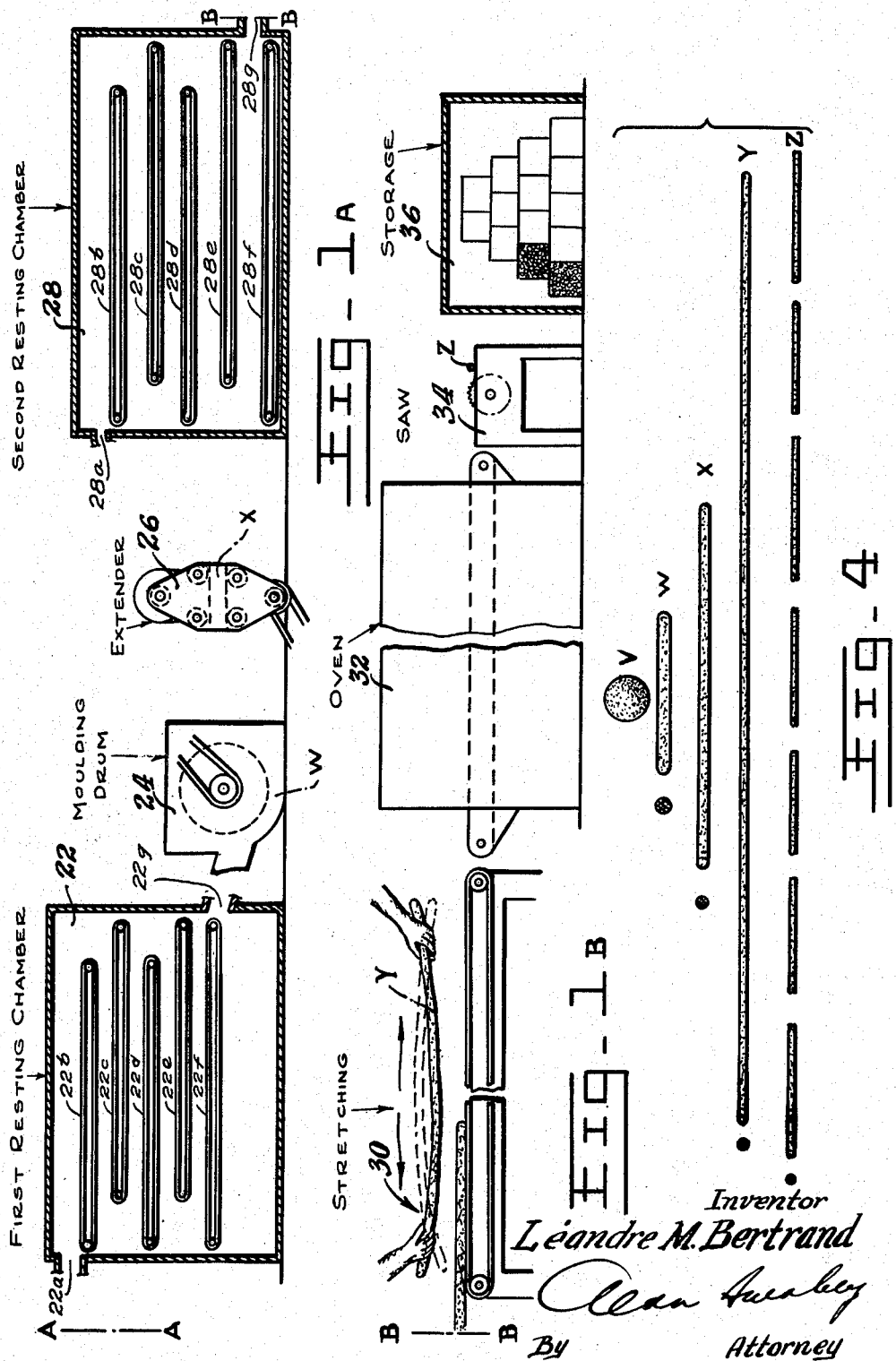

Patented Nov. 24, 1953

2,660,134

UNITED STATES PATENT OFFICE 2,660,134

PROCESS FOR MANUFACTURING BREAD STICKS

Leandre M. Bertrand, Montreal, Quebec, Canada, assignor to The Grissol Bread Specialties Ltd., Rosemount, Quebec, Canada, a corporation of Canada Application July 14, 1948, Serial No. 38,622

7 Claims. (Cl. 107—54)

Introduction

This invention relates to the preparation of manufactured food articles and more particularly to the preparation of an improved bread stick characterized by its low moisture content.

Bread is one of the staple foods and its high nutritive value makes it one of the most common foods for everyone's table. The humidity which is found in the average loaf of bread is approximately 40% and prevents its conservation for any substantial length of time. This humidity causes the bread to become stale a few days after it is prepared and subject to bacteriological decomposition after about a week.

The usual process of preparing bread consists in mixing the ingredients, subjecting the mixture to fermentation and then to proofing. The dough is then moulded and passed through a humidifier before being conveyed to the oven. The bread after baking is then passed through a cooling chamber after which it is ready for delivery.

Many attempts have been made to prepare suitable bread sticks having a sufficiently low humidity content to allow for their conservation over a period of years. These, in general, have failed because they relied on the conventional rolling of the dough to remove the excess humidity. This procedure does not provide a sufficient means of absorbing air within the dough making up the bread stick and thus a high percentage of humidity remains in the final product, thereby preventing any lengthy period of conservation.

Applicant's development

According to the present invention, there is provided a process for the preparation of bread sticks having less than about 5% humidity which are, therefore, capable of being conserved for a few years.

Essentially the applicant's process involves working new dough then confining the dough in a substantially dead air space to retard fermentation.

A preferred process for preparing these bread sticks includes the following steps.

Dough is mixed with special ingredients and is divided into substantially globular units. These units are rested for a short time after dividing, under conditions which retard fermentation. The pieces of dough are then submitted to a series of shaping operations from which they emerge as elongated cylindrical dough portions. The dough portions are then rested for approximately three times as long as the initial resting period again under conditions which retard fermentation. The dough portions are next subjected to a stretching process, preferably by hand, in which they are agitated and twirled, while stretching, until they are elongated to a form having a suitable cross-sectional diameter which will give the desired size to the bread sticks when baked. The elongated dough portions are then placed in suitable ovens for baking.

As will be understood by those familiar with the art, this process is contrary to the usual practice of bread-making. Ordinarily, dough containing yeast is allowed to proof or ferment for a period immediately after the mixing process and is again subjected to a further and more complete proofing after having been divided and moulded to the desired size for bread, rolls, or the like. The conditions which retard fermentation of the dough containing yeast as contemplated in the applicant's process are important in that to obtain the desired stretch or elongation necessary for the successful preparation of the bread sticks, the dough must remain substantially inert or "green," throughout the shaping and elongating steps. If the dough had been proofed, as is usual, it would not be possible to stretch it to the length required. Further, the proofing forms a skin or outer layer on the dough, which is detrimental to the air-absorbing qualities required. This skin or outer layer is not formed when dough is treated according to the present invention.

The purpose of the manual stretching step is to obtain an elongated strip of dough which after baking is cut to desired lengths. The bread stick obtained has a much more open-cell structure than is customary in similar products. This structure aids in dehydration during the baking process as the heat is thus enabled to penetrate completely through the bread stick. Bread sticks manufactured according to this process contain less than about 5% humidity. Preferably the bread sticks, after baking, are stored for a period of about 10 days to allow for complete maturing.

Detailed description

Having thus generally described the nature of the invention, particular reference will be made to the accompanying drawings illustrating a preferred type of apparatus which may be utilized to carry out the process, and in which:

Figures 1 and 1A, in continuation from line A—A thereof, are a diagrammatic view illustrating in operative sequence a portion of a preferred apparatus utilized in the process according to the invention.

Figure 1B is a diagrammatic view of a continuation of the apparatus as shown in Figure 1A, from line B—B.

Figure 2 is an enlarged side elevation partially in section illustrating the construction of the moulding drum.

Figure 3 is an enlarged side elevation of the extender with its cover removed to illustrate the construction more clearly.

Figure 4 is a series of diagrammatic views of dough portions illustrating in sequence the form of the dough as it is passed through the various stages of the apparatus.

As shown in Figures 1, 1A and 1B, flour 10, which is preferably unbleached, is passed through sifting machine 13 and conveyed to the mixer 14 by hand or suitable conveying means as indicated by arrow 12. The sifting machine 13 and mixer 14 are conventional in structure and are old and well known. The sifter 13 comprises a series of superimposed sieves which are vibrated mechanically. The mixer comprises a mechanically operated impeller including several blades, adapted to mix the dough. Other ingredients 16 are introduced into the mixer 14 operating at a semi-high speed. After thorough mixing, the dough so produced is divided in a cutter and shaper 18. The shaper is an old and well known apparatus. This shaper 18 is made up of a wheel with a pocket on its periphery which at each rotation gathers a portion of the dough and moulds it into a unit. The units of dough are next passed through a rounder 20. The rounder 20 is also old and well known in the art and adapted to form the units into small rounded pieces of dough. The small rounded pieces of dough are then rested in a first fermentation-retardation chamber 22 for about 5 minutes and conveyed to the moulding drum 24. The moulding drum 24 is adapted to form the round pieces of dough to a substantially cylindrical or globular form, and is of a special design as will be described more fully later. The small pieces of dough are then submitted to moderate elongation on an extender 26 and again passed through a second fermentation-retardation chamber 28 for about 15 minutes. The pieces of dough are then submitted to manual stretching as indicated at 30 after which they are conveyed to an oven 32 where they are baked. The oven 32 is an old and well known apparatus. This oven has trays in it which are conveyed in a circuitous path. Means is provided to heat the dough while travelling through this path. The dough pieces may be placed in the oven and removed by hand or suitable conveying means may be provided. After baking, the sticks are cut to the desired lengths on a saw 34, packaged, and allowed to mature in a stock room 36 for about 10 days.

The entire process takes about one hour from initial mixing till the dough is ready for baking. It has been found that five minutes is sufficient for the initial resting period and fifteen minutes sufficient for the second resting period.

In order to show more clearly the shapes of a dough portion as it passes through the various machines making up the apparatus, particular reference will be made to Figure 4 in which V represents the dough portion as it leaves the rounder 20. W represents the dough portion after passing through the drum 24. X represents the dough portion after passing through the extender 26. Y represents the dough portion in the final elongated form after the stretching process indicated at 30. Z represents the finished bread stick as it may be divided after baking for packaging.

Ingredients

The flour preferably used in making bread sticks according to the invention is one that is substantially unbleached. The flour is preferably sifted. The other ingredients that are to be mixed in the flour are yeast, salt, malt, hydrogenated vegetable shortening and water. With regard to the malt, a liquid form is used. All the ingredients are thoroughly mixed in a semi-high speed mixer. The dough is then ready to be processed. If desired, dehydrated and granulated cheddar cheese may also be incorporated into the mixture. It is preferable to use a cheese having about 2.5% moisture content to avoid rancidity.

The following is an example of the preferred amounts used in making up a batch of dough for the preparation of bread sticks and should be taken in an illustrative sense only.

| | | |
|---|---|---|
| Malt liquid (i. e. malt and water) | lb | 1 |
| Salt | lb | 1¾ |
| Yeast | ounces | 10 |
| Vegetable shortening | lbs | 3 |
| Sugar | lb | 1¾ |
| Flour (unbleached) | lbs | 98 |
| Water | gals | 6 |

These quantities will make approximately 160 lbs. dough which after being processed and baked will yield approximately 82 lbs. of dehydrated breadstick.

With reference to the apparatus employed in carrying out this process, most of this is standard in any bake shop. However, some of this apparatus requires additional features for the successful manufacture of the bread sticks and these machines are now described in more detail with particular reference to changes necessary to standard equipment.

Cutter and rounder

The cutter or divider 18 which is used is similar to that commonly used in the baking industry, with minor adjustments as to the size of the pieces of dough desired. Pieces of dough of about 5 lbs. are fed to the cutter and are divided into small pieces averaging about 3 ounces each. The rounder used is the conventional rounder used in the industry. The rounding step is used only to give to the dough unit a preliminary elongated shape, and is not contributory to preventing skin formation. If the preliminary steps are performed quickly, no skin will have time to form and thus the dough will not tend to crack when being worked.

Fermentation-retardation chamber

Normally dough used in the making of bread or bread products is proofed or treated to stimulate the fermentation of the mix prior to baking. This is generally accomplished by placing the dough in a proofer and submittting the dough to steam or warm air for a considerable length of time. In the applicant's process it was found that while the dough had to be rested for short periods between forming, it was also found that the dough had to be retarded as much as possible from rising or fermenting. Specially designed structures were made for this purpose which the applicant chooses to call fermentation-retardation chambers. The temperature of these chambers is that of the room, i. e. about 70° F. and the atmospheric conditions which normally promote fermentation or proofing are absent therein. These atmospheric conditions are usually steam, humidity, or high temperatures. Fermentation, skin formation and expansion of the dough are retarded by avoiding these conditions. Briefly, these chambers comprises substantially airtight chambers 22 and 28, respectively. The chamber 22 has an inlet 22a through which the dough portions are inserted. Within the chamber 22 are a number of endless conveyor belts 22b, 22c, 22d, 22e and 22f arranged one above the other. So, when the dough units are inserted through the inlet 22a, they are conveyed by these belts, first in one direction then in the other from the top to the bottom of the chamber 22. The chamber 22 has an outlet opening 22g near the delivery end of the bottom belt 22f. The dough may be inserted in the chamber 22 by hand or a suitable conveyor apparatus may be provided for the purpose. Likewise the dough may be transferred from chamber 22 by hand or by a suitable conveyor to the rounding apparatus 24. Similarly the dough pieces can be transferred from one to the other of the various other units of my apparatus by hand or by a suitable conveyor.

It has been found that dough that has been rested in these chambers does not rise any appreciable amount and remains inert or "green" allowing it to be stretched and formed to a greater degree than is possible with dough prepared in the usual manner.

Moulding drum

The special drum 24 used is shown in Figure 2. This differs from the standard apparatus in that a single roller is employed instead of the conventional plurality of rollers for moulding the dough.

In this special construction the apparatus comprises a casing 70 provided with an inlet 72 and an outlet 74. A drum 76 is rotatably mounted in the case 70. The casing 70 is also provided with a curved wall 78 having a surface which is parallel to the peripheral surface of the drum 76. The pieces of dough admitted at inlet 72 are gently pressed and elongated between the opposing face of the drum 76 and the curved wall 78 and are thus given a substantially cylindrical form. The drum is preferably about 9 inches in width.

Extender

The extender preferably used is an apparatus designed for this particular process and is not a standard bake shop machine. This extender is used to further elongate the pieces of dough to about 16 inches. As shown in Figure 3 the extender is comprised essentially of two endless converging conveyor belts 80 moving in different directions at different speeds. The small pieces of dough passing between the belts are rolled by the belts moving in opposite directions and so elongated.

Second fermentation retarding chamber

The construction of the chamber 28 is similar to that of the chamber 22. The chamber is provided with an inlet opening 28a and an outlet opening 28g. Conveyor belts 28b, 28c, 28d, 28e, and 28f, are provided for conveying the dough portions while being rested, from the inlet 28a to the outlet 28g.

Hand stretching

Hand stretching is a most important step and is not found in the prior art dealing with the preparation of bread sticks. Preferably this operation may be done manually. It is also contemplated that the same effect may be obtained by the use of suitable apparatus. This operation consists in taking the ends of an elongated piece of dough and stretching and agitating said dough axially while twirling. Stretching of dough to this extent can be obtained only if fermentation has been substantially retarded to a point where it is substantially nil and the dough is inert as was described earlier in the applicant's preferred process.

The baking in the oven is done for a period of from 13 to 18 minutes while the temperature is from about 325° to 400° F.

Advantages

The advantages of the applicant's process will be understood by one familiar with the art. The dough as prepared by the preferred process contains an unusual amount of air and as the dough portions are formed by gentle rolling and stretching rather than being squeezed or pressed into shape, the bread sticks thus prepared have an unusually light and open-celled structure. This enables them to be baked at considerably lower temperatures and in considerably less time than is usual, and results in a bread stick that is practically dehydrated.

I claim:

1. A process for the preparation of rods of dough substantially devoid of a skin and suitable for baking into dry bread sticks having a low moisture content, comprising, working and dividing new dough, confining the dough in a substantially dead air space containing no added humidity to retard fermentation and skin formation so as to give the dough stretchability, and then working the thus treated dough to elongate it.

2. A process according to claim 1, in which the confinement ranges from about 5 to about 15 minutes.

3. A process for the preparation of rods of dough substantially devoid of a skin and suitable for baking into dry bread sticks having a low moisture content, comprising, working and dividing new dough, confining the dough in a substantially dead air space to retard fermentation and skin formation so as to give the dough stretchability, then working the thus treated dough to elongate it, again confining the dough in a substantially dead air space to retard fermentation and skin formation so as to give the dough stretchability and then working the thus treated dough again to elongate it.

4. A process according to claim 3, in which the time of the first confinement is about one third of the second.

5. A process according to claim 4, in which the first confinement is about 5 minutes and the second confinement about 15 minutes.

6. A process for preparing bread sticks of low moisture content, comprising, working and dividing new dough, confining the dough in a substantially dead air space to retard fermentation and skin formation, then working the thus treated dough to elongate it, repeating the confinement under substantially the same conditions, then working the dough again to elongate it, and finally baking the elongated dough into bread sticks.

7. A process according to claim 6, in which the first confinement of the dough is for about 5 minutes and the second confinement is for about 15 minutes.

LEANDRE M. BERTRAND.

References Cited in the file of this patent

UNITED STATES PATENTS

| Number | Name | Date |
|---|---|---|
| 736,313 | Thibodeau | Aug. 11, 1903 |
| 790,920 | Richards | May 30, 1905 |
| 915,010 | Young | Mar. 9, 1909 |
| 1,076,464 | Stiriz | Oct. 21, 1913 |
| 1,203,361 | Kohman et al. | Oct. 31, 1916 |
| 1,529,107 | Backus | Mar. 10, 1925 |
| 1,578,617 | VanHouten | Mar. 30, 1926 |
| 1,601,781 | VanHouten | Oct. 5, 1926 |
| 2,071,434 | Sarnmark | Feb. 23, 1937 |
| 2,104,282 | Wagener et al. | Jan. 4, 1938 |
| 2,187,354 | MacManus | Jan. 16, 1940 |
| 2,253,770 | Duffy, Jr. | Aug. 26, 1941 |
| 2,255,282 | Duffy, Jr., et al. | Sept. 9, 1941 |
| 2,495,469 | Nafziger | Jan. 24, 1950 |